(12) United States Patent
Tokushima et al.

(10) Patent No.: US 10,788,814 B2
(45) Date of Patent: Sep. 29, 2020

(54) ENCODER, ROBOT, AND PRINTER

(71) Applicant: Seiko Epson Corporation, Tokyo (JP)

(72) Inventors: Daiki Tokushima, Azumino (JP); Takayuki Kondo, Chino (JP)

(73) Assignee: Seiko Epson Corporation (JP)

( * ) Notice: Subject to any disclaimer, the term of this patent is extended or adjusted under 35 U.S.C. 154(b) by 4 days.

(21) Appl. No.: 16/167,946

(22) Filed: Oct. 23, 2018

(65) Prior Publication Data

US 2019/0121323 A1 Apr. 25, 2019

(30) Foreign Application Priority Data

Oct. 24, 2017 (JP) ................. 2017-205416

(51) Int. Cl.
| | |
|---|---|
| *G05B 19/41* | (2006.01) |
| *G05B 19/414* | (2006.01) |
| *B41J 29/38* | (2006.01) |
| *G01D 5/347* | (2006.01) |
| *B25J 9/04* | (2006.01) |

(Continued)

(52) U.S. Cl.
CPC ............ *G05B 19/414* (2013.01); *B25J 9/042* (2013.01); *B25J 9/1692* (2013.01); *B25J 13/088* (2013.01); *B41J 29/38* (2013.01); *G01D 5/3473* (2013.01); *G01D 5/34715* (2013.01); *G01D 5/34776* (2013.01); *G06T 7/74* (2017.01);

(Continued)

(58) Field of Classification Search
CPC ........ G05B 19/414; G05B 2219/39024; G05B 2219/37555; G05B 2219/37183; B25J 13/088; B25J 9/042; B25J 9/1692; B25J 9/00; B25J 9/0009; B25J 19/04; G06T 7/74; B41J 29/00; B41J 29/38; G01D 5/00; G01D 5/26; G01D 5/34776; G01D 5/34715; G01D 5/3473

See application file for complete search history.

(56) References Cited

U.S. PATENT DOCUMENTS

2016/0008988 A1* 1/2016 Kennedy .................... B25J 9/06
 414/738
2016/0110628 A1* 4/2016 Hwang ................ G01B 21/042
 348/135

(Continued)

FOREIGN PATENT DOCUMENTS

| JP | 2008-003000 A | 1/2008 |
| JP | 2011-169677 A | 9/2011 |

(Continued)

*Primary Examiner* — Tony Ko
(74) *Attorney, Agent, or Firm* — Harness, Dickey & Pierce, P.L.C.

(57) ABSTRACT

An encoder includes a base portion, a scale portion that is provided to be relatively rotatable with respect to the base portion, and has a plurality of marks, an imaging element that is disposed in the base portion, and images the marks, and an estimation portion that performs template matching on a captured image in the imaging element by using a reference image, in which the plurality of marks include a first mark and a second mark, and the estimation portion counts the number of pixels of the imaging element corresponding to a rotation angle of the scale portion with respect to the base portion until a position of the second mark is detected from detection of a position of the first mark, and performs calibration on the basis of the counted number of pixels and the rotation angle.

6 Claims, 11 Drawing Sheets

(51) Int. Cl.
  *B25J 9/16*   (2006.01)
  *G06T 7/73*   (2017.01)
  *B25J 13/08*  (2006.01)

(52) U.S. Cl.
  CPC .............. *G05B 2219/37555* (2013.01); *G05B 2219/39024* (2013.01)

(56) References Cited

U.S. PATENT DOCUMENTS

| | | |
|---|---|---|
| 2017/0274537 A1 | 9/2017 | Kondo et al. |
| 2018/0031394 A1 | 2/2018 | Tokushima |

FOREIGN PATENT DOCUMENTS

| | | |
|---|---|---|
| JP | 2012-237638 A | 12/2012 |
| JP | 2015-106287 A | 6/2015 |
| JP | 2017-177238 A | 10/2017 |
| JP | 2018-017594 A | 2/2018 |

\* cited by examiner

ENCODER, ROBOT, AND PRINTER

BACKGROUND

1. Technical Field

The present invention relates to an encoder, a robot, and a printer.

2. Related Art

In the related art, calibration in an encoder is performed by separately using a highly accurate encoder for calibration as disclosed in JP-A-2012-237638.

However, separately using the encoder for calibration has a problem that calibration takes time, and it is hard to perform highly accurate calibration.

SUMMARY

An advantage of some aspects of the invention is to provide an encoder capable of performing highly accurate calibration even without separately using an encoder for calibration, and to provide a robot and a printer having the encoder.

The invention can be implemented as the following application examples or forms.

An encoder according to an application example includes a base portion; a scale portion that is provided to be relatively movable or rotatable with respect to the base portion, and has a plurality of marks including a first mark and a second mark; an imaging element that is disposed in the base portion, and images the marks; and an estimation portion that performs template matching on a captured image in the imaging element by using a reference image, so as to detect positions of the marks, and estimates a movement state or a rotation state of the scale portion with respect to the base portion, in which the estimation portion counts the number of pixels of the imaging element corresponding to a movement amount or a rotation angle of the scale portion with respect to the base portion until a position of the second mark is detected from detection of a position of the first mark, and performs calibration on the basis of the counted number of pixels and the movement amount or the rotation angle.

According to the encoder, since the estimation portion counts the number of pixels of the imaging element corresponding to a movement amount or a rotation angle of the scale portion with respect to the base portion until a position of the second mark is detected from detection of a position of the first mark, and performs calibration on the basis of the counted number of pixels and the movement amount or the rotation angle, it is possible to perform highly accurate calibration even without separately using an encoder for calibration.

In the encoder according to the application example, it is preferable that the scale portion is relatively rotatable with respect to the base portion.

With this configuration, it is possible to realize a rotary encoder.

It is preferable that the encoder according to the application example further includes a storage portion that stores an absolute position or an absolute angle of at least one of the first mark and the second mark with respect to the base portion.

With this configuration, it is possible to perform calibration in an absolute type encoder.

An encoder according to an application example includes a base portion; a scale portion that is provided to be relatively movable or rotatable with respect to the base portion, and has a plurality of marks including a first mark; an imaging element that is disposed in the base portion, and images the marks; and an estimation portion that performs template matching on a captured image in the imaging element by using a reference image, so as to detect positions of the marks, and estimates a rotation state of the scale portion with respect to the base portion, in which the estimation portion counts the number of pixels of the imaging element until a position of the first mark is detected next after the scale portion is rotated by 360° with respect to the base portion from detection of a position of the first mark, and performs calibration on the basis of the counted number of pixels and the rotation angle of 360°.

According to the encoder, since the estimation portion counts the number of pixels of the imaging element corresponding to a movement amount or a rotation angle of the scale portion with respect to the base portion until a position of the second mark is detected from detection of a position of the first mark, and performs calibration on the basis of the counted number of pixels and the movement amount or the rotation angle, it is possible to perform highly accurate calibration even without separately using an encoder for calibration. It is not necessary to measure relative positions of the first mark and the second mark in advance, and it is possible to simplify calibration.

A robot according to an application example includes the encoder according to the application example; a first member; and a second member that is provided to be rotatable with respect to the first member, in which the encoder detects a rotation state of the second member with respect to the first member.

According to the robot, the robot can perform a highly accurate operation by using the encoder performing highly accurate calibration.

It is preferable that the robot according to the application example further includes a decelerator that forwards drive force to the second member side from the first member side, in which the scale portion is preferably connected to the second member.

With this configuration, it is possible to estimate a rotation state of the second member with respect to the first member with high accuracy compared with a case of detecting a rotation state of a decelerator on an input shaft side.

A printer according to an application example includes the encoder according to the application example.

According to the printer, the printer can perform a highly accurate operation by using the encoder performing highly accurate calibration.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an encoder, a robot, and a printer according to embodiments of the invention will be described in detail with reference to the accompanying drawings.

1. Robot

First Embodiment

Figure 1:
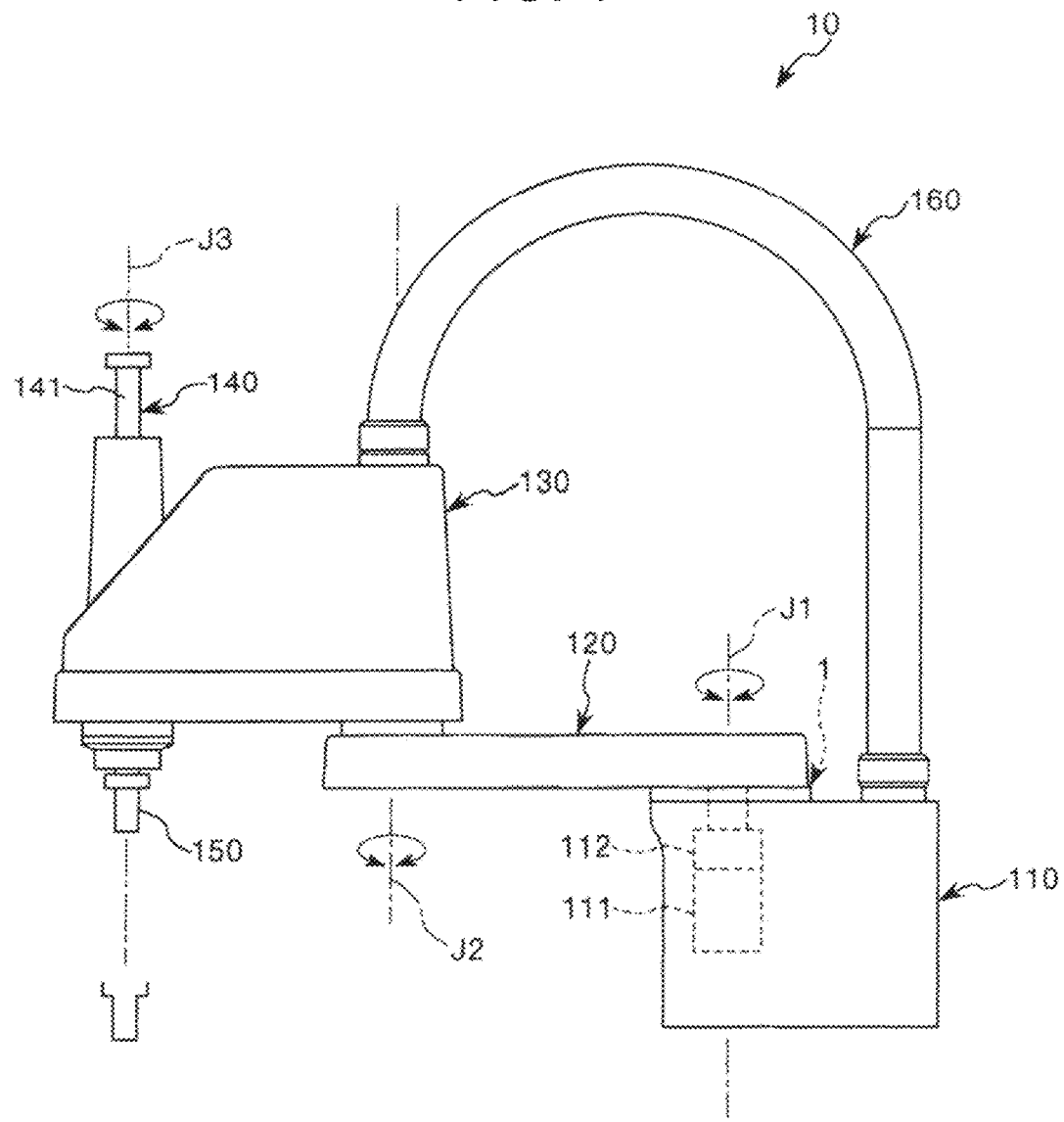
FIG. 1 is a side view illustrating a robot according to a first embodiment of the invention.

FIG. 1 is a side view illustrating a robot of a first embodiment of the invention. In the following description, for convenience of description, in FIG. 1, an upper part is referred to as an "upper side", and a lower part is referred to as a "lower side". In FIG. 1, a base side is referred to as a "basal end", and an opposite side (end effector side) thereto is referred to as a "distal end". In FIG. 1, an upward-and-downward direction is referred to as a "vertical direction", and a leftward-and-rightward direction is referred to as a "horizontal direction".

A robot 10 illustrated in FIG. 1, which is a so-called horizontal articulated robot (scalar robot), is used for a manufacturing process of manufacturing, for example, precision equipment, and can perform holding or transport of the precision equipment or components.

As illustrated in FIG. 1, the robot 10 includes a base 110, a first arm 120, a second arm 130, a work head 140, an end effector 150, and a wiring routing portion 160. Hereinafter, the respective portions of the robot 10 will be described briefly in order.

The base 110 is fixed to, for example, a floor surface (not illustrated) via bolts or the like. The first arm 120 is connected to an upper end of the base 110. The first arm 120 is rotatable about a first axis J1 along the vertical direction with respect to the base 110.

The base 110 is provided with a first motor 111 which generates drive force for rotating the first arm 120, and a first decelerator 112 which reduces the rotation of the drive force from the first motor 111. An input shaft of the first decelerator 112 is connected to a rotation shaft of the first motor 111, and an output shaft of the first decelerator 112 is connected to the first arm 120. Thus, if the first motor 111 is driven, and a drive force therefrom is forwarded to the first arm 120 via the first decelerator 112, the first arm 120 is rotated about the first axis J1 in a horizontal plane with respect to the base 110.

An encoder 1 which is a first encoder detecting a state of the first arm 120 being rotated with respect to the base 110 is provided at the base 110 and the first arm 120.

A distal end of the first arm 120 is connected to the second arm 130. The second arm 130 is rotatable about a second axis J2 along the vertical direction with respect to the first arm 120. Although not illustrated, the second arm 130 is provided with a second motor which generates drive force for rotating the second arm 130, and a second decelerator which reduces the drive force from the second motor. The drive force from the second motor is forwarded to the first arm 120 via the second decelerator, and thus the second arm 130 is rotated about the second axis J2 in a horizontal plane with respect to the first arm 120. Although not illustrated, the second motor is provided with a second encoder which detects a state of the second arm 130 being rotated with respect to the first arm 120.

The work head 140 is disposed at a distal end of the second arm 130. The work head 140 includes a spline shaft 141 inserted into a spline nut and a ball screw nut (none illustrated) which are disposed coaxially at the distal end of the second arm 130. The spline shaft 141 can be rotated about an axis thereof and can be moved up and down in the vertical direction, with respect to the second arm 130.

Although not illustrated, the second arm 130 is provided with a rotation motor and a lifting motor. If drive force from the rotation motor is forwarded to the spline nut via a drive force forwarding mechanism (not illustrated), and thus the spline nut is rotated in normal and reverse directions, the spline shaft 141 is rotated in the normal and reverse directions about an axis J3 along the vertical direction. Although not illustrated, the rotation motor is provided with a third encoder which detects a state of the spline shaft 141 being rotated with respect to the second arm 130.

On the other hand, if drive force from the lifting motor is forwarded to the ball screw nut via a drive force forwarding mechanism (not illustrated), and thus the ball screw nut is rotated in normal and reverse directions, the spline shaft 141 is moved up and down. The lifting motor is provided with a fourth encoder detecting a movement amount of the spline shaft 141 with respect to the second arm 130.

A distal end (lower end) of the spline shaft 141 is connected to the end effector 150. The end effector 150 is not particularly limited, and may employ, for example, an end effector holding an object to be transported, or an end effector processing an object to be processed.

A plurality of wires connected to the respective electronic components (for example, the second motor, the rotation motor, the lifting motor, and the first to fourth encoders) disposed in the second arm 130 are routed to the base 110 through the tubular wiring routing portion 160 which connects the second arm 130 to the base 110. The plurality of wires are collected inside the base 110, and are thus routed to a control device (not illustrated) which is provided outside the base 110 and generally controls the robot 10 along with wires connected to the first motor 111 and the encoder 1.

As mentioned above, a configuration of the robot 10 has been described briefly. The robot 10 includes the base 110 which is a first member, the first arm 120 which is a second member rotatably provided with respect to the base 110, and the encoder 1, and the encoder 1 detects a rotation state of the first arm 120 with respect to the base 110. As will be described later, according to the robot 10, the robot 10 can perform a highly accurate operation by using the encoder 1 performing highly accurate calibration.

Encoder

Hereinafter, the encoder 1 will be described later in detail. Hereinafter, a description will be made of an example of a case where the encoder 1 is incorporated into the robot 10.

Figure 2:
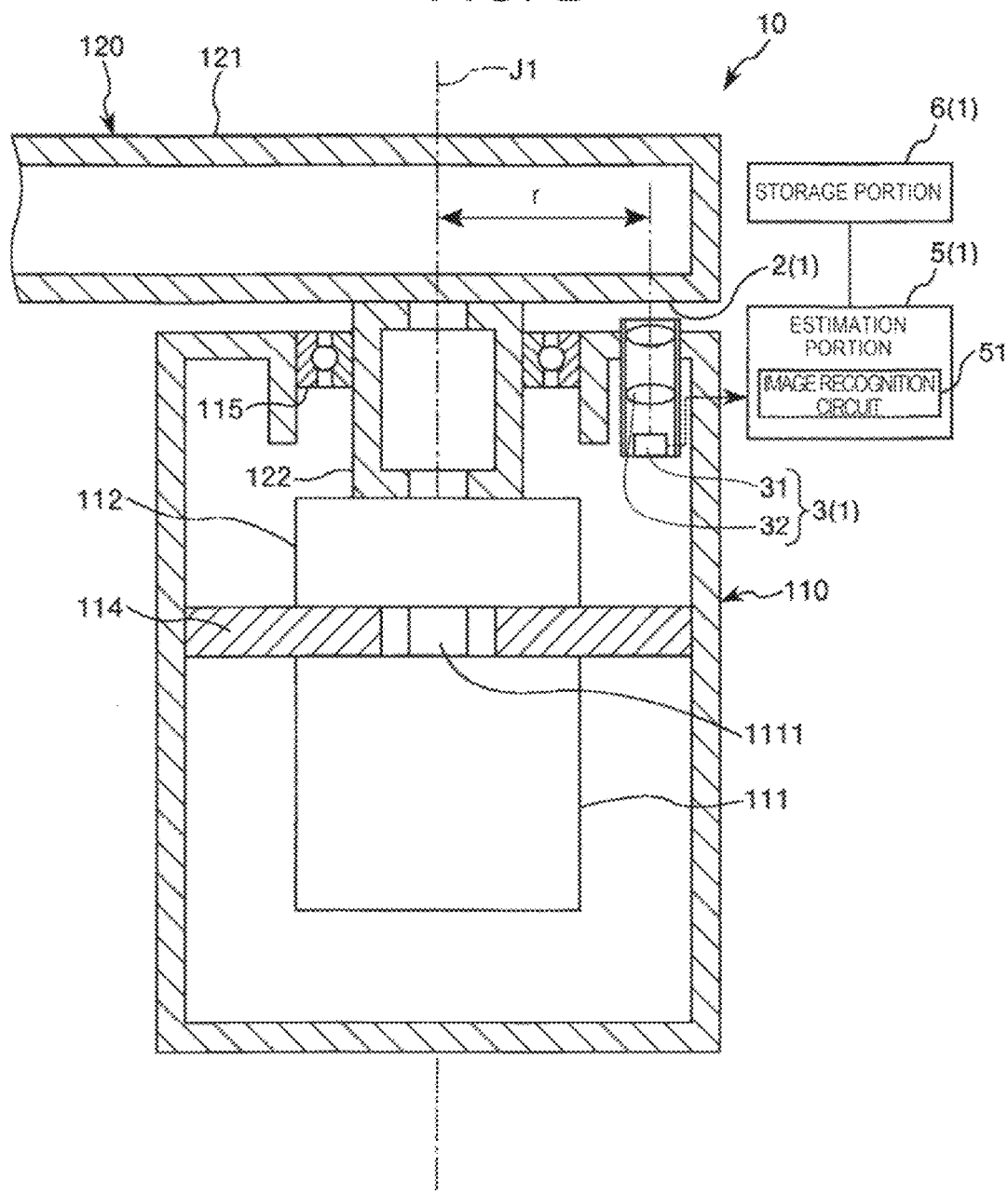
FIG. 2 is a sectional view illustrating an encoder provided in the robot illustrated in FIG. 1.
Figure 3:
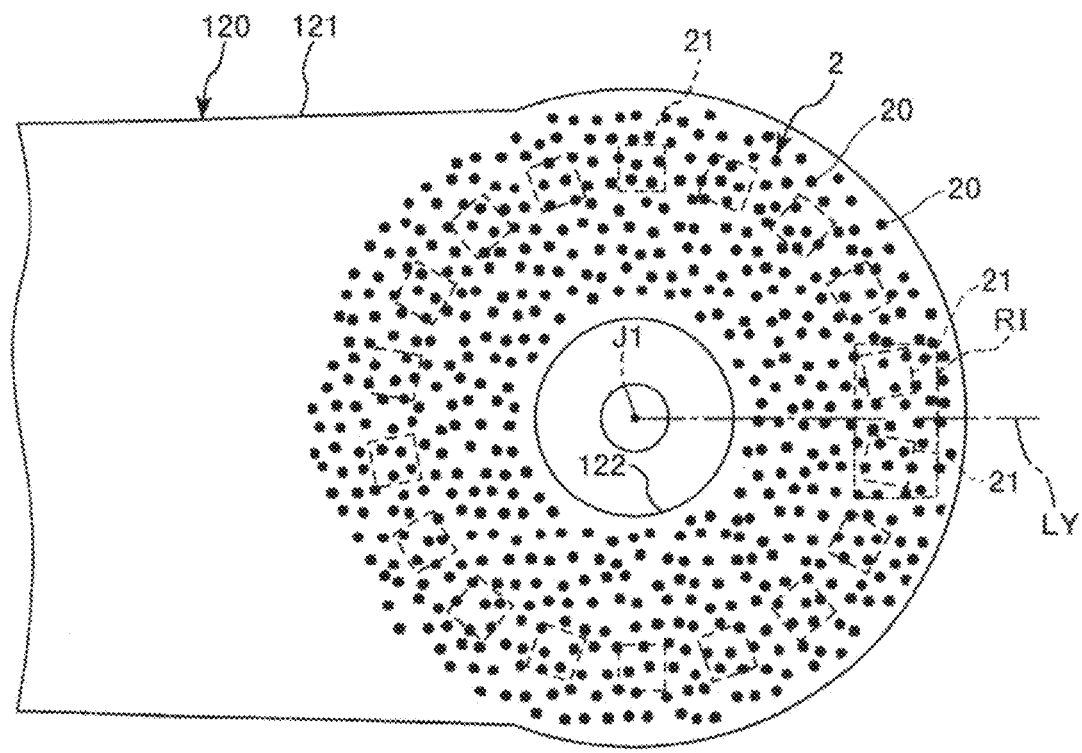
FIG. 3 is a diagram for explaining a scale portion provided in the encoder illustrated in FIG. 2.
Figure 4:
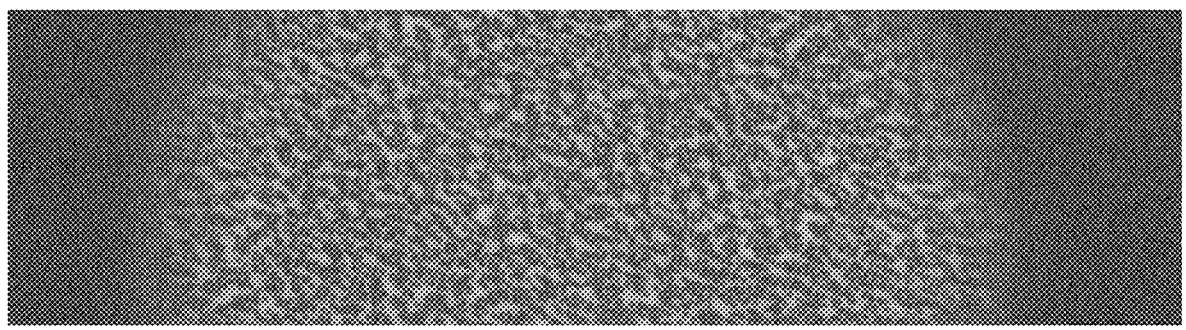
FIG. 4 is a picture illustrating an enlarged dot pattern based on a dithering method.
Figure 5:
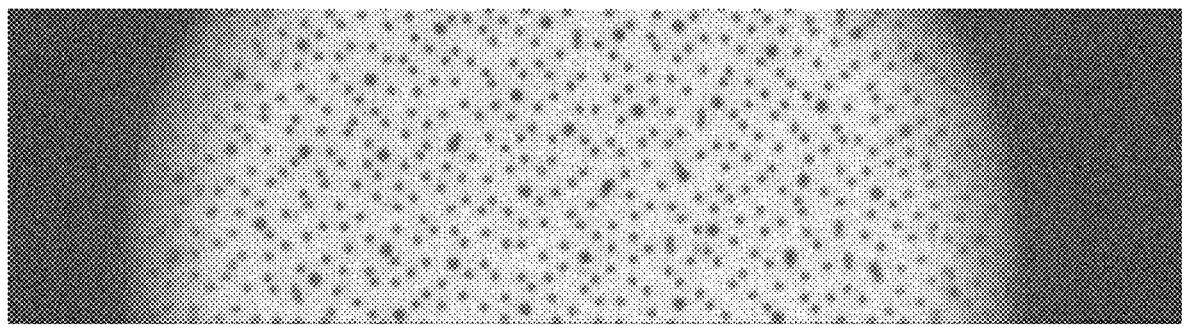
FIG. 5 is a picture illustrating an enlarged dot pattern based on a dithering method, in which a density of dots is lower than in the case illustrated in FIG. 4.

FIG. 2 is a sectional view illustrating the encoder provided in the robot illustrated in FIG. 1. FIG. 3 is a diagram for explaining a scale portion provided in the encoder illustrated in FIG. 2. FIG. 4 is a picture illustrating an enlarged dot pattern based on a dithering method. FIG. 5 is a picture illustrating an enlarged dot pattern based on a dithering method, in which a density of dots is lower than in the case illustrated in FIG. 4. In each drawing excluding FIGS. 4 and 5, for convenience of description, a scale of each unit is changed as appropriate, and an illustrated configuration does not necessarily match an actual scale, and illustration of each unit is simplified as appropriate.

As illustrated in FIG. 2, the base 110 of the robot 10 includes a support member 114 supporting the first motor 111 and the first decelerator 112, and stores the first motor 111 and the first decelerator 112 therein. The base 110 is provided with the first arm 120 which is rotatable about the first axis J1.

The first arm 120 includes an arm main body portion 121 which extends along the horizontal direction, and a shaft portion 122 which protrudes downward from the arm main body portion 121, and the two portions are connected to each other. The shaft portion 122 is supported at the base 110 via a bearing 115 so as to be rotatable about the first axis J1, and is also connected to the output shaft of the first decelerator 112. The input shaft of the first decelerator 112 is connected to a rotation shaft 1111 of the first motor 111.

Here, the base 110 is a structural body to which a load based on the dead weight of the base 110 or the mass of other elements supported by the base 110 is applied. Similarly, the first arm 120 is also a structural body to which a load based on the dead weight of the first arm 120 or the mass of other elements supported by the first arm 120 is applied. Materials forming the base 110 and the first arm 120 are not particularly limited, and may employ, for example, metal materials.

In the present embodiment, outer surfaces of the base 110 and the first arm 120 form a part of an outer surface of the robot 10. Exterior members such as a cover and an impact absorbing material may be attached to the outer surfaces of the base 110 and the first arm 120.

The relatively rotated base 110 and first arm 120 are provided with the encoder 1 detecting rotation states thereof.

The encoder 1 includes a scale portion 2 provided at the first arm 120, a detection portion 3 provided at the base 110 and detecting the scale portion 2, an estimation portion 5 estimating relative rotation states of the base 110 and the first arm 120 on the basis of a detection result in the detection portion 3, and a storage portion 6 which is electrically connected to the estimation portion 5.

The scale portion 2 is provided at a portion of the arm main body portion 121 facing the base 110, that is, a portion surrounding the shaft portion 122 on a lower surface of the arm main body portion 121. As illustrated in FIG. 3, the scale portion 2 has irregular patterns disposed along the first axis J1 at positions which are different from the first axis J1. Here, the scale portion 2 is provided on the surface of the first arm 120. Consequently, a member for providing the scale portion 2 is not required to be provided separately from the base 110 and the first arm 120. Thus, it is possible to reduce the number of components. The scale portion 2 is not limited to a case of being directly provided on the surface of the first arm 120, and may be provided on a sheet member adhered to the surface of the first arm 120, and may be provided on a tabular member which is provided to be rotated along with the first arm 120. In other words, a member (rotation portion) provided with the scale portion 2 may be a member which is rotated about the first axis J1 along with the first arm 120 with respect to the base 110.

As illustrated in FIG. 3, the scale portion 2 (irregular pattern) is configured such that a plurality of dots 20 (pattern) which can be imaged by an imaging element 31 are irregularly disposed. Here, the "irregular pattern" indicates that, in a case where the scale portion 2 is rotated over a necessary angle range (in the present embodiment, an angle range in which the first arm 120 can be rotated with respect to the base 110) about the first axis J1, an identical pattern (a pattern which cannot be identified by the estimation portion 5) does not appear twice or more with a size corresponding to a reference image TA which will be described later in a predetermined region (for example, an effective visual field region RU or a retrieval region RS which will be described later) within a captured image G which will be described later and which is imaged by the imaging element 31. Thus, each of a plurality of portions at different positions of the scale portion 2 can be used as a mark 21 for identifying a position of the scale portion 2 in a circumferential direction. As mentioned above, the scale portion 2 can be said to have a plurality of marks 21 for identifying different positions of the scale portion 2 in the circumferential direction. FIG. 3 illustrates a case where the plurality of marks 21 are arranged along a circumference centering on the first axis J1. Positions, sizes, and the number of marks 21 illustrated in FIG. 3 are only examples, and are not limited thereto.

The scale portion 2 (pattern) may be formed by using, for example, an ink jet printer (an example of a printing apparatus). In this case, a grayscale image which is processed by using a dithering method is output by using an FM screening method which is a method of expressing gradations or grayscales by adjusting a density of the dots 20, and thus the patterns as illustrated in FIG. 4 or 5 are obtained and may be used for the scale portion 2. FIG. 4 illustrates an example of a pattern in a case where a plurality of dots 20 are relatively densely disposed. FIG. 5 illustrates an example of a pattern in a case where a plurality of dots 20 are relatively roughly disposed. In order to obtain such a pattern, an FM screening method may be used alone, and a method (a so-called hybrid screening method) of combining the FM screening method with other methods (for example, an AM screening method which is a method of expressing gradations or grayscales by adjusting a size of a dot) may be used.

Since the patterns of the scale portion 2 are consecutively disposed around the first axis J1, there is less restriction in a position in a rotation direction (circumferential direction) and the degree of freedom is increased when the estimation portion 5 which will be described later generates a reference image (template). Since the patterns of the scale portion 2 are disposed outside the effective visual field region RU of the captured image G in the Y axis direction, a reference image (template) can be generated even if positioning of the scale portion 2 (pattern) for the first arm 120 is not performed with high accuracy, and thus a rotation state can be estimated.

The scale portion 2 may have a gradation which gradually changes along the circumferential direction. In other words, a density (disposition density) of the plurality of dots 20 may change along the periphery of the first axis J1 (rotation axis). A color of the dot 20 (pattern) of the scale portion 2 is not particularly limited, and may be any color, but is preferably different from colors of portions other than the dots 20 of the scale portion 2, and is more preferably black or a dark color. Consequently, a contrast of a captured image obtained by the imaging element 31 can be increased, and, as a result, detection accuracy can be improved.

A shape of the dot 20 (pattern) of the scale portion 2 is illustrated to be a circular shape, but is not limited thereto, and may be, for example, an elliptical shape, a quadrilateral shape, or a deformed shape. The patterns of the scale portion 2 are not limited to dot patterns (repetition of a pattern) such as patterns formed of the plurality of dots 20, and may be, for example, patterns formed of linear lines, patterns formed of curved lines, patterns formed of a combination of at least two of dots, linear lines, and curved lines, or inverse patterns thereof.

The patterns of the scale portion 2 are not limited to patterns formed with ink such as dyes or pigments by using the above-described printing apparatus as long as the patterns can be imaged by the imaging element 31, and may be, for example, patterns based on an irregular shape, or patterns formed on a natural object. The patterns based on an irregular shape may be, for example, irregularities based on roughness or unevenness of a processing surface using etching, cutting, shot blasting, sand blasting, or filing, irregularities using fibers on a surface of paper, a cloth (a nonwoven fabric or a woven fabric), or the like, or irregularities of a coating film surface. The patterns formed on a natural object may be, for example, wood grains. For example, a coating film is formed by using transparent paint with which black beads are mixed, a coating film in which a plurality of black beads are irregularly disposed can be obtained, and the plurality of beads of the coating film may be used for the scale portion 2 as irregular patterns.

The marks 21 of the scale portion 2 are not limited to the illustrated irregular patterns, may use numbers, and may use letters such as roman letters, Arabic letters, and Chinese letters, and may use, for example, symbols, signs, tokens, emblems, designs, or a one-dimensional barcode or a QR code (registered trademark) other than letters.

The detection portion 3 illustrated in FIG. 2 includes the imaging element 31 provided in the base 110, and an optical system 32 provided in an opening of the base 110. The imaging element 31 images a part (an imaging region RI illustrated in FIG. 3) of the scale portion 2 in the circumferential direction of the scale portion 2 via the optical system 32. A light source which illuminates the imaging region RI of the imaging element 31 may be provided as necessary.

As the imaging element 31, for example, a charge coupled device (CCD) or a complementary metal oxide semiconductor (CMOS) may be used. The imaging element 31 converts a captured image into an electric signal for each pixel so as to output the electric signal. The imaging element 31 may employ a two-dimensional imaging element (area image sensor) or a one-dimensional imaging element (line image sensor). The one-dimensional imaging element is preferably disposed in a direction in which arrangement of pixels is in contact with a turning circle of the arm. In a case where the two-dimensional imaging element is used, a two-dimensional image having a large amount of information can be acquired, and thus it becomes easier to increase the detection accuracy of the marks 21 using template matching which will be described later. As a result, it is possible to detect a rotation state of the first arm 120 with high accuracy. In a case where the one-dimensional imaging element is used, since an image acquisition cycle, that is, a so-called frame rate is high, it is possible to increase a detection frequency, and thus this is advantage in terms of a high speed operation.

The optical system 32 is an image forming optical system disposed between the scale portion 2 and the imaging element 31. The optical system 32 preferably has a telecentric object side (the scale portion 2 side). Consequently, even if a distance between the scale portion 2 and the imaging element 31 varies, a change in an image forming magnification toward the imaging element 31 can be reduced, and, as a result, it is possible to minimize deterioration in detection accuracy in the encoder 1. Particularly, in a case where the optical system 32 is of a bitelecentric type, even if a distance between a lens of the optical system 32 and the imaging element 31 varies, a change in an image forming magnification toward the imaging element 31 can be reduced. Thus, there is an advantage in which assembling of the optical system 32 is facilitated.

Here, as illustrated in FIG. 3, the imaging region RI of the imaging element 31 is set to overlap a part of the scale portion 2 in the circumferential direction on the lower surface of the first arm 120. Consequently, the imaging element 31 can image the mark 21 located in the imaging region RI. Therefore, the mark 21 located in the imaging region RI is read, and thus a rotation state of the first arm 120 can be understood.

The estimation portion 5 illustrated in FIG. 2 estimates relative rotation states of the base 110 and the first arm 120 on the basis of a detection result in the detection portion 3. The rotation states may include, for example, a rotation angle, a rotation speed, and a rotation direction.

Particularly, the estimation portion 5 includes an image recognition circuit 51 which performs image recognition on the marks 21 by performing template matching on a captured image (captured image data) in the imaging element 31 by using a reference image (reference image data), and estimates relative rotation states of the base 110 and the first arm 120 by using a recognition result in the image recognition circuit 51.

Here, the estimation portion 5 is configured to be able to more finely estimate a relative rotation angle (hereinafter, also simply referred to as a "rotation angle of the first arm 120") of the base 110 and the first arm 120 on the basis of a position of an image of the mark 21 in a captured image obtained by the imaging element 31. The estimation portion 5 is configured to be able to obtain a rotation speed on the basis of a time interval at which the marks 21 are detected, or to estimate a rotation direction on the basis of an order of the types of detected marks 21. The estimation portion 5 outputs a signal corresponding to the above-described estimation result, that is, a signal corresponding to a rotation state of the base 110 and the first arm 120. The signal is input to, for example, a control device (not illustrated), and is used to control an operation of the robot 10.

The estimation portion 5 has a function of cutting out apart of the captured image obtained by the imaging element 31, so as to generate a reference image (template). The generation of a reference image is performed for each relative rotation state before estimating a relative rotation state of the base 110 and the first arm 120 or at an appropriate time as necessary. The generated reference image is stored in the storage portion 6 in correlation with each relative rotation state of the base 110 and the first arm 120. The estimation portion 5 performs template matching by using the reference image (template) stored in the storage portion 6. Template matching and an estimation of a rotation state using the template matching will be described later in detail.

The estimation portion 5 may be configured by using, for example, an application specific integrated circuit (ASIC) or a field programmable gate array (FPGA). As mentioned above, the estimation portion 5 is formed of hardware by using the ASIC or the FPGA, and thus it is possible to achieve a high processing speed, miniaturization, and low cost of the estimation portion 5. The estimation portion 5 may be configured to include, for example, a processor such as a central processing unit (CPU) and a memory such as a read only memory (ROM) or a random access memory (RAM). In this case, the processor executes a program stored in the memory as appropriate, and thus the above-described functions can be realized. At least a part of the estimation portion 5 may be incorporated into the control device.

Here, the storage portion 6 stores the reference image (reference image data) along with information regarding a coordinate (a coordinate of a reference pixel which will be described later) corresponding to the reference image, and information (angle information) regarding a rotation angle of the first arm 120, for each relative rotation state of the base 110 and the first arm 120. As the storage portion 6, a nonvolatile memory and a volatile memory may be used, but the nonvolatile memory is preferably used from the viewpoint that a state of storing information can be held even if power is not supplied, and power can be saved. The storage portion 6 may be integrally configured with the estimation portion 5.

Template Matching and Estimation of Rotation State Using Template Matching

Hereinafter, a detailed description will be made of template matching and an estimation of a rotation state using template matching in the estimation portion 5. Hereinafter, as an example, a description will be made of a case where a rotation angle is estimated as a rotation state.

Acquisition of Reference Image

In the encoder 1, a reference image used for template matching is acquired before a rotation state of the first arm 120 with respect to the base 110 is estimated by using template matching. The acquisition of a reference image may be performed only once before initial template matching, but may be performed at an appropriate timing as necessary thereafter. In this case, a reference image used for template matching may be updated to an acquired new reference image.

When a reference image is acquired, the first arm 120 is rotated about the first axis J1 with respect to the base 110 as appropriate, and an image of each mark 21 is captured by the imaging element 31 for the plurality of marks 21. Each obtained captured image is trimmed, and thus a reference image of each mark 21 is generated. The generated reference image is stored in the storage portion 6 along with and in correlation with pixel coordinate information and angle information. Hereinafter, this will be described in detail with reference to FIG. 6.

Figure 6:
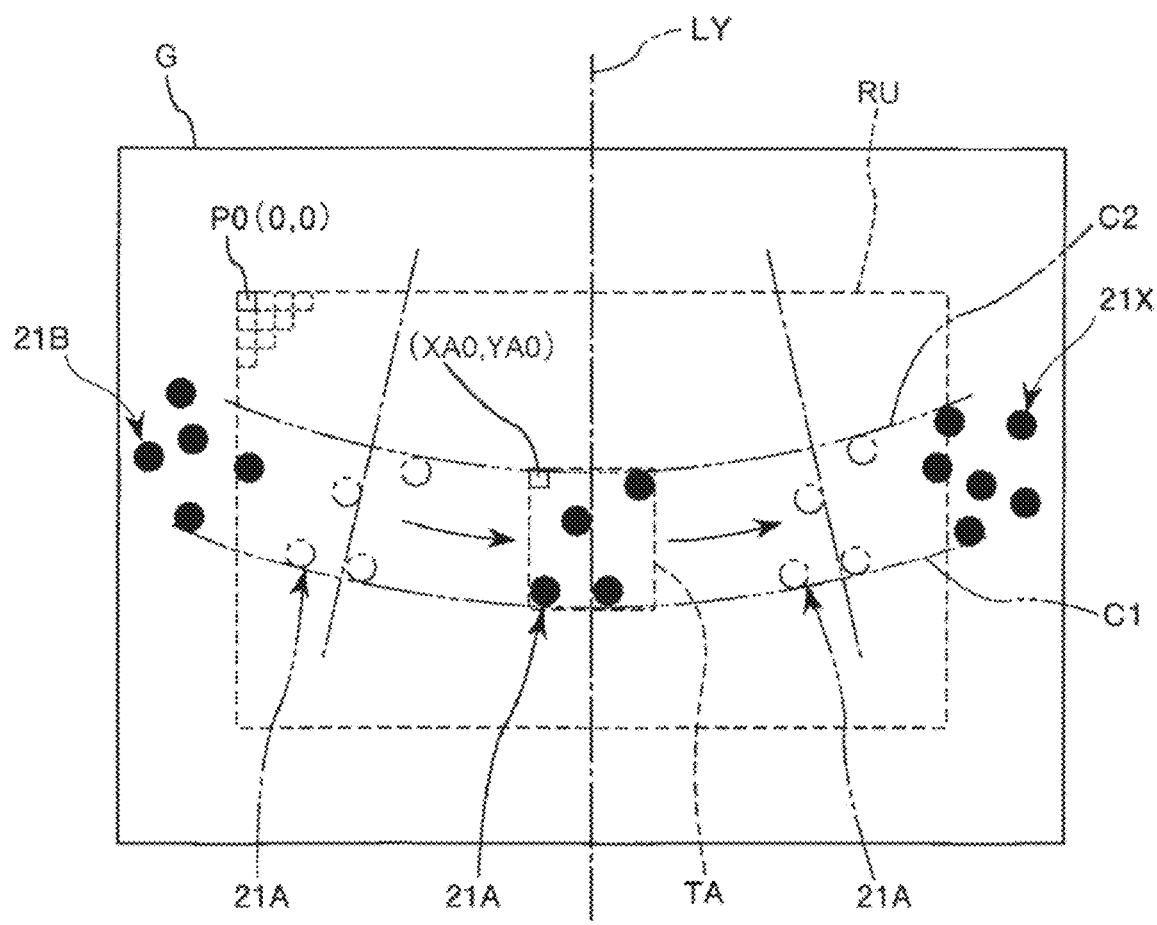
FIG. 6 is a diagram for explaining a captured image obtained by an imaging element provided in the encoder illustrated in FIG. 2.

FIG. 6 is a diagram for explaining a captured image obtained by the imaging element provided in the encoder illustrated in FIG. 2.

In a case where the first arm 120 is rotated about the first axis with respect to the base 110, for example, as illustrated in FIG. 6, a mark image 21A which is an image of the mark 21 reflected in the captured image G in the imaging element 31 is moved along circular arcs C1 and C2 in the captured image G. Here, the circular arc C1 is a trajectory drawn by a lower end of the mark image 21A in FIG. 6 due to rotation of the first arm 120 with respect to the base 110, and the circular arc C2 is a trajectory drawn by an upper end of the mark image 21A in FIG. 6 due to rotation of the first arm 120 with respect to the base 110. FIG. 6 illustrates a case where three marks 21 are included in the imaging region RI illustrated in FIG. 3, and, in correspondence thereto, the captured image G illustrated in FIG. 8 includes not only the mark image 21A but also a mark image 21B located on one side in the circumferential direction with respect to the mark image 21A and a mark image 21X located on the other side.

Here, the captured image G obtained through imaging in the imaging element 31 has a shape corresponding to the imaging region RI, and has a rectangular shape having two sides extending in an X axis direction and two sides extending in a Y axis direction. The two sides of the captured image G in the X axis direction are disposed along the circular arcs C1 and C2 as much as possible. The captured image G has a plurality of pixels arranged in a matrix form in the X axis direction and the Y axis direction. Here, a position of a pixel is expressed by a pixel coordinate system (X,Y) indicated by "X" indicating a position of the pixel in the X axis direction and "Y" indicating a position of the pixel in the Y axis direction. A central region excluding an outer periphery of the captured image G is set as an effective visual field region RU, and a pixel at an upper left end of the figure in the effective visual field region RU is set as an origin pixel (0,0) of the pixel coordinate system (X,Y).

In a case where a reference image TA corresponding to the mark image 21A is generated, the first arm 120 is rotated with respect to the base 110 as appropriate, and the mark image 21A is located at a predetermined position (in FIG. 6, on a central line LY set at the center in the X axis direction) in the effective visual field region RU. Here, a rotation angle θA0 of the first arm 120 with respect to the base 110 when the mark image 21A is located at the predetermined position is acquired in advance through measurement or the like.

The captured image G is trimmed in a rectangular pixel range as a required minimum range including the mark image 21A, and thus the reference image TA (a template for detection of the mark 21) is obtained. The obtained reference image TA is stored in the storage portion 6. In this case, the reference image TA is stored along with and in correlation with angle information regarding the rotation angle ΔA0, and pixel information regarding a reference pixel coordinate (XA0,YA0) which is a pixel coordinate of a reference pixel (in FIG. 6, the pixel at the upper left end) in the pixel range of the reference image TA. In other words, the reference image TA, the angle information, and the pixel coordinate information are a single template set used for template matching. Here, in a case where the encoder 1 is of an absolute type, angle information in this template set is an absolute angle. In a case where the encoder 1 is of an incremental type, angle information in this template set is a relative angle. The angle information and the pixel coordinate information in the template set may be adjusted through calibration which will be described later.

Estimation of Rotation State Using Template Matching

Next, with reference to FIGS. 7 to 10, a description will be made of template matching using the reference image TA generated as described above.

Figure 7:
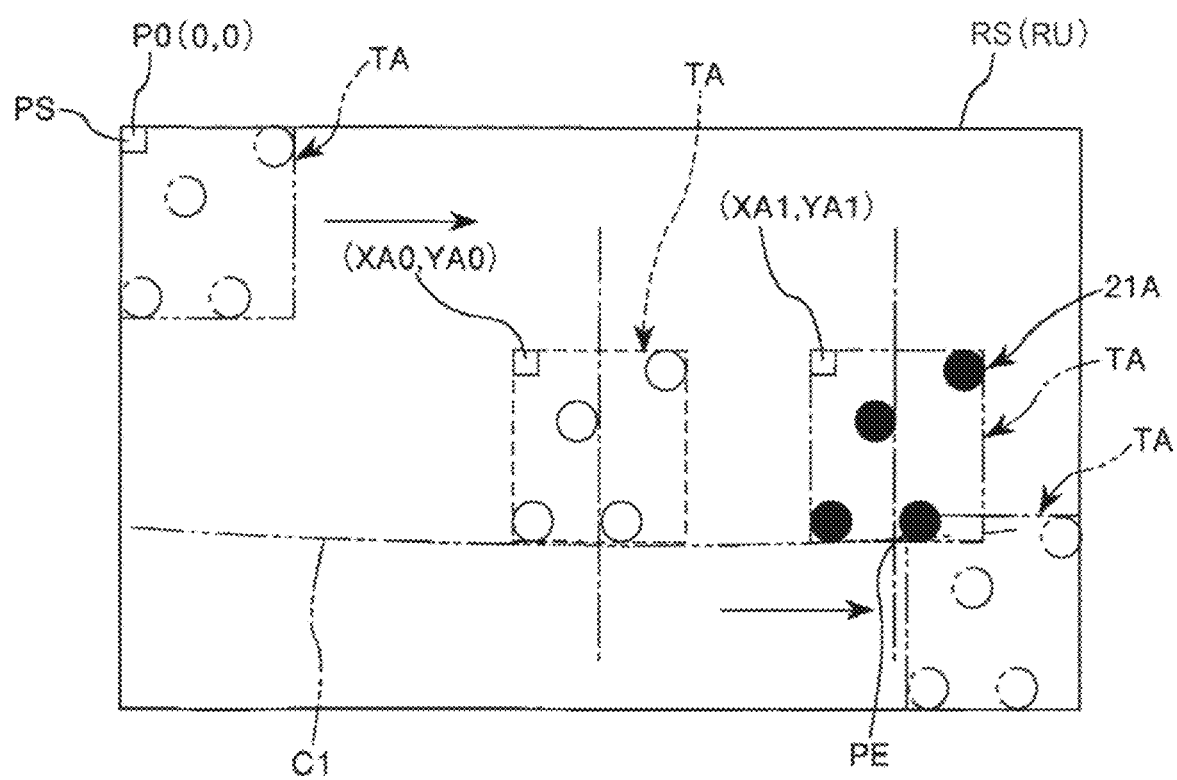
FIG. 7 is a diagram for explaining template matching in a retrieval region set in the captured image illustrated in FIG. 6.
Figure 8:
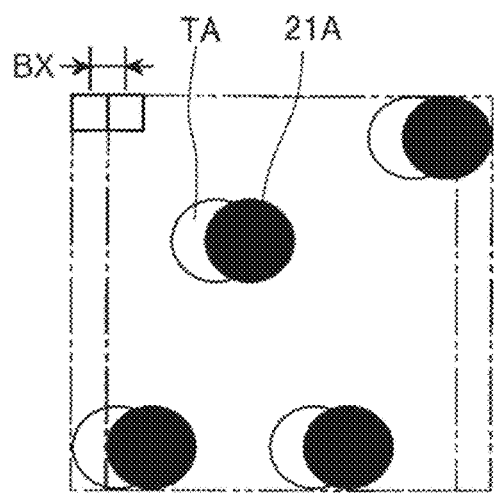
FIG. 8 is a diagram illustrating a state in which a correlation value is deviated by one pixel from a state in which the correlation value is the maximum or the minimum during template matching.
Figure 9:
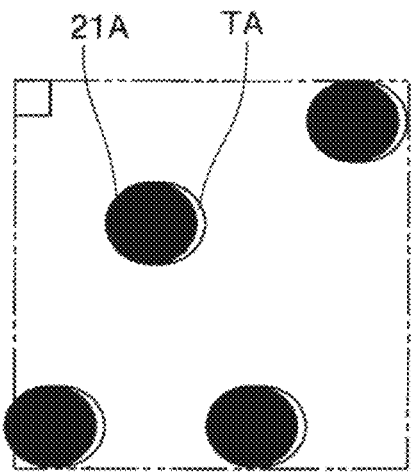
FIG. 9 is a diagram illustrating a state in which a correlation value is the maximum or the minimum during template matching.
Figure 10:
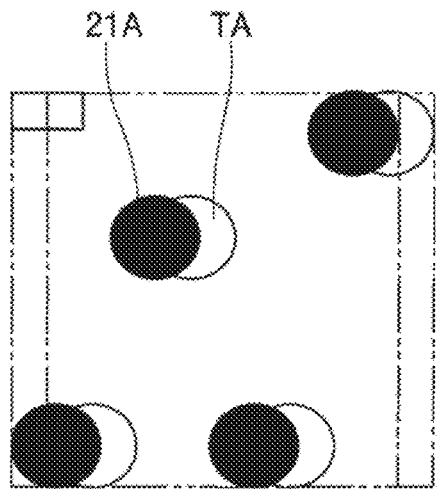
FIG. 10 is a diagram illustrating a state in which a correlation value is deviated by one pixel toward an opposite side to the state illustrated in FIG. 8 from a state in which the correlation value is the maximum or the minimum during template matching.

FIG. 7 is a diagram for explaining template matching in a retrieval region set in the captured image illustrated in FIG. 6. FIG. 8 is a diagram illustrating a state in which a correlation value is deviated by one pixel from a state in which the correlation value is the maximum or the minimum during template matching. FIG. 9 is a diagram illustrating a state in which a correlation value is the maximum or the minimum during template matching. FIG. 10 is a diagram illustrating a state in which a correlation value is deviated by one pixel toward an opposite side to the state illustrated in FIG. 8 from a state in which the correlation value is the maximum or the minimum during template matching.

As illustrated in FIG. 7, when the mark image 21A is present in the effective visual field region RU, template matching is performed on an image of the effective visual field region RU by using the reference image TA. In the present embodiment, the entire effective visual field region RU is set as a retrieval region RS, the reference image TA overlaps the retrieval region RS, and a correlation value of an overlapping portion between the retrieval region RS and the reference image TA is calculated while deviating the reference image TA by one pixel with respect to the retrieval region RS. Here, a pixel coordinate of the reference pixel of the reference image TA is moved by one pixel from a start coordinate PS (origin pixel P0) to an end pixel PE, and a correlation value of an overlapping portion between the retrieval region RS and the reference image TA is calculated for each pixel coordinate of the reference pixel of the reference image TA with respect to the pixels of the entire retrieval region RS. The calculated correlation value is stored in the storage portion 6 in correlation with the pixel coordinate of the reference pixel of the reference image TA as correlation value data between captured image data and reference image data.

The maximum correlation value is selected from among the plurality of correlation values for each of the pixel coordinates stored in the storage portion 6, and a pixel coordinate (XA1,YA1) of the reference image TA having the selected correlation value is determined as a pixel coordinate of the mark image 21A. In the above-described way, it is possible to detect a position of the mark image 21A in the captured image G.

Here, a subpixel estimation method is preferably used to obtain a pixel coordinate of the mark image 21A. As illustrated in FIGS. 8 to 10, the reference image TA overlaps the mark image 21A in the vicinity of the maximum correlation value. In the state illustrated in FIG. 9, a correlation value is greater than in the states (states of being deviated by one pixel from the state illustrated in FIG. 9) illustrated in FIGS. 8 and 10, and the correlation value is greatest. However, as in the state illustrated in FIG. 9, in a case where the reference image TA does not completely match the mark image 21A, and overlaps the mark image 21A so as to be deviated therefrom, if it is determined that the state illustrated in FIG. 9 is a pixel position of the mark image 21A, a difference therebetween is an error. The difference is a visual field size BX to the maximum. In other words, in a case where the subpixel estimation method is not used, the visual field size BX is the minimum resolution (accuracy). In contrast, if the subpixel estimation method is used, a correlation value for each visual field size BX can be fitted with a parabola (an equal-angle line may also be used), and thus such an inter-correlation value (inter-pixel pitch) can be complemented (approximated). Thus, it is possible to obtain a pixel coordinate of the mark image 21A with higher accuracy. In the above description, as an example, a description has been made of a case where a pixel coordinate at which a correlation value is the maximum is used for a pixel position of the mark image 21A, but template matching may be performed such that a pixel coordinate at which a correlation value is the minimum is used for a pixel position of the mark image 21A.

As mentioned above, the estimation portion 5 sets the retrieval region RS in the effective visual field region RU which is a partial region of the captured image G, and template matching is performed within the retrieval region RS. Consequently, the number of pixels of the retrieval region RS used for template matching can be reduced, and thus a calculation time related to the template matching can be reduced. Thus, even in a case where angular velocity of the first arm 120 about the first axis J1 is high, it is possible to perform highly accurate detection. Even if distortion or blurring of the outer peripheral portion of the captured image G increases due to aberration of the optical system 32 disposed between the imaging element 31 and the marks 21, a region in which such distortion or blurring is small is used as the retrieval region RS, and thus it is possible to minimize deterioration in the detection accuracy. Generation of the reference image TA and template matching may be performed by using the entire region of the captured image G, and, in this case, correction is preferably performed by taking into consideration aberration as necessary.

In the present embodiment, since a distance between the imaging region RI and the first axis J1 is sufficiently long, each of the circular arcs C1 and C2 can be approximated to a substantially straight line in the captured image G. Therefore, a movement direction of the mark image 21A in the captured image G may be considered to match the X axis direction.

Therefore, the mark image 21A illustrated in FIG. 7 is located at a position deviated by the number of pixels (XA1-XA0) in the X axis direction with respect to the reference image TA located at the reference pixel coordinate (XA0, YA0). Therefore, in a case where a distance between the center of the imaging region RI and the first axis J1 is indicated by r, and a width (a visual field size per pixel of the imaging element 31) of a region on the imaging region RI in the X axis direction, corresponding to one pixel of the imaging element 31 is indicated by W, a rotation angle θ of the first arm 120 with respect to the base 110 may be obtained by using Equation (1) as follows.

$$\theta = \theta A0 + \frac{(XA1 - XA0) \times W}{2r\pi} \times 360[°] \quad (1)$$

In Equation (1), (XA1−XA0)×W corresponds to a distance between an actual position corresponding to the reference pixel coordinate (XA0,YA0) of the reference image TA and an actual position corresponding to the pixel coordinate (XA1,YA1) of the reference image TA at which the above-described correlation value is the maximum. 2rπ corresponds to a length of a trajectory of the mark 21 (a length of a circumference) when the first arm 120 is rotated by 360° with respect to the base 110. ΔA0 indicates a rotation angle of the first arm 120 with respect to the base 110 when the mark image 21A is located at a predetermined position as described above. The rotation angle θ is an angle by which the first arm 120 is rotated from a reference state (0°) with respect to the base 110.

The above-described template matching and calculation of the rotation angle θ using the template matching are also performed on other marks 21 in the same manner. Here, a reference image corresponding to each mark 21 is registered such that at least one of the marks 21 is reflected without being omitted in the effective visual field region RU, and template matching can be performed, with respect to any rotation angle θ. Consequently, it is possible to prevent the occurrence of an angle range in which template matching cannot be performed.

In FIG. 6 described above, the marks 21 and the effective visual field region RU are configured such that a single mark 21 is reflected without being omitted in the effective visual field region RU with respect to any rotation angle θ, but the marks 21 and the effective visual field region RU are preferably configured such that a plurality of marks 21 are reflected without being omitted in the effective visual field region RU with respect to any rotation angle θ. In this case, template matching is performed by using two or more reference images corresponding to two or more marks 21 adjacent to each other such that the template matching can be performed on the plurality of marks 21 reflected in the effective visual field region RU with respect to any rotation angle θ. In this case, the two or more reference images may partially overlap each other.

In other words, the imaging element 31 preferably images all of at least two marks 21 among the plurality of marks 21 which are targets of template matching. Consequently, even if one of the two marks 21 imaged by the imaging element 31 cannot be accurately read due to contamination or the like, the other mark 21 can be read, and thus detection can be performed. Thus, there is an advantage in which it becomes easier to ensure high detection accuracy. As mentioned above, the estimation portion 5 preferably performs template matching by simultaneously using a plurality of reference images with respect to the retrieval region RS. Consequently, it is possible to increase detection accuracy. Template matching using a plurality of reference images will be described in detail in a second embodiment.

Calibration

Figure 11:
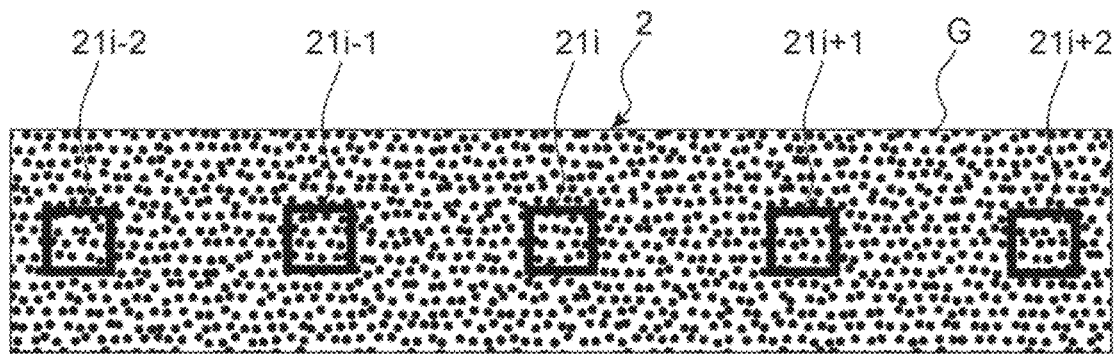
FIG. 11 is a diagram for explaining a plurality of marks formed on the scale portion illustrated in FIG. 3.
Figure 12:
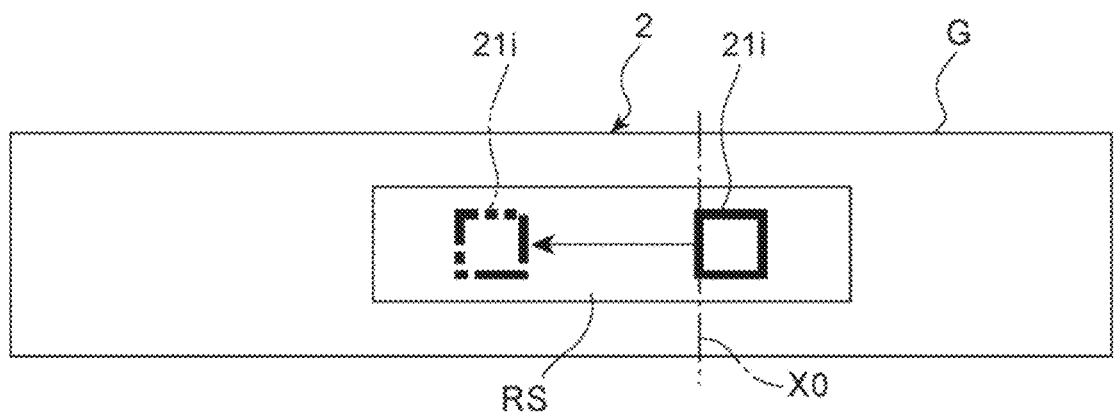
FIG. 12 is a diagram for explaining detection of a position of a first mark (starting of counting of the number of pixels).
Figure 13:
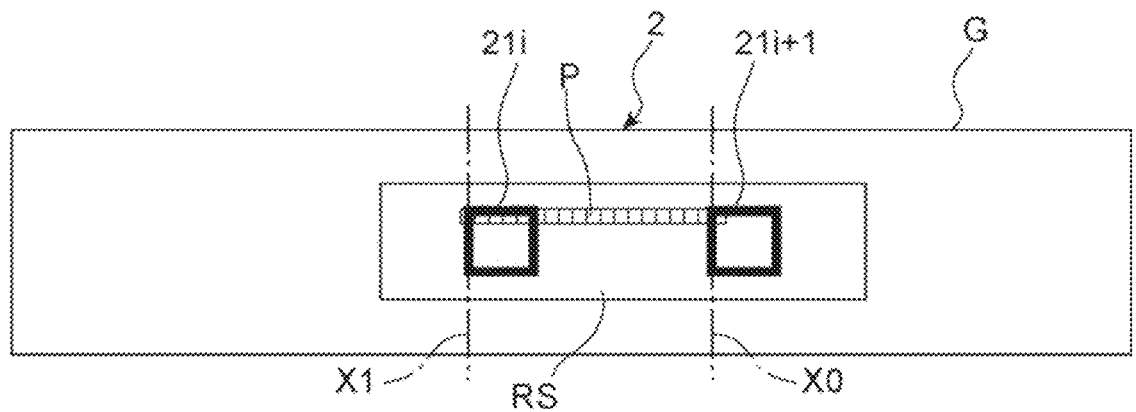
FIG. 13 is a diagram for explaining detection of a mark subsequent to the first mark.
Figure 14:
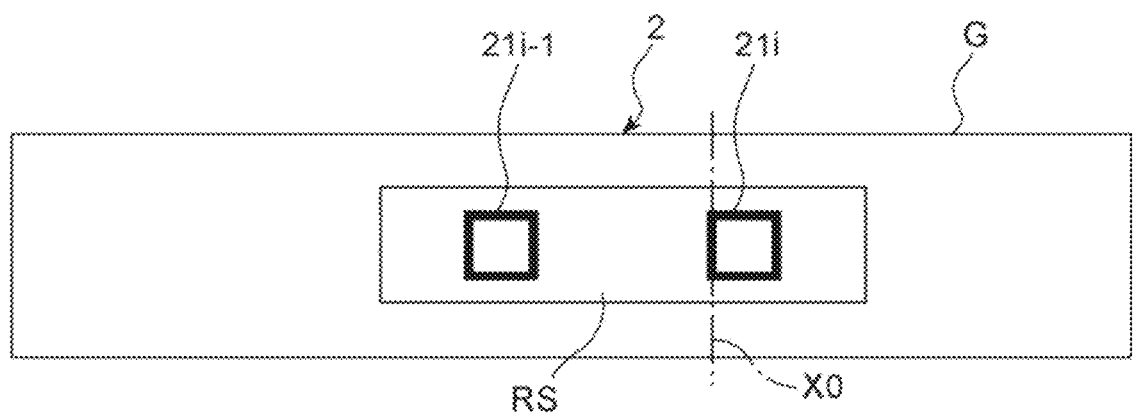
FIG. 14 is a diagram for explaining detection of a position of a second mark (finishing of counting of the number of pixels).

FIG. 11 is a diagram for explaining a plurality of marks included in the scale portion illustrated in FIG. 3. FIG. 12 is a diagram for explaining a detection of a position of a first mark (starting of counting of the number of pixels). FIG. 13 is a diagram for explaining detection of a mark subsequent to the first mark. FIG. 14 is a diagram for explaining detection of a position of a second mark (finishing of counting of the number of pixels). In FIG. 11, the patterns of the scale portion 2 are illustrated, but, for convenience of description, the patterns of the scale portion 2 are not illustrated in FIGS. 12 to 14. In FIGS. 12 to 14, marks other than marks required in description are not illustrated.

As illustrated in FIG. 11, a plurality of marks 21 are set on the scale portion 2 in the rotation direction. FIG. 11 illustrates a state in which five marks $21i-2$ to $21i+2$ from $(i-2)$-th to $(i+2)$-th are reflected in the captured image G. Here, i is a number attached to each of the mark 21 in an arrangement order thereof, and is an integer of 1 or more and n or less in a case where the number of marks 21 set on the scale portion 2 is n (where n is an integer of 3 or more).

As described above, the estimation portion 5 detects a position of the mark 21 reflected in the retrieval region RS through template matching, so as to obtain a relative or absolute rotation angle of the first arm 120 (a rotation angle of the scale portion 2) with respect to the base 110. In this case, the estimation portion 5 uses a reference image stored in the storage portion 6 along with angle information and pixel coordinate information.

Here, in a case where the angle information stored in the storage portion 6 is deviated from an actual relative angle or absolute angle, detection accuracy in the encoder 1 is reduced. Therefore, calibration described below is performed. Hereinafter, a description will be made of a case where the mark 21 is moved from the right side in the figure toward the left side inside the retrieval region RS. Calibration may be similarly performed in a case where the mark 21 is moved from the left side in the figure toward the right side inside the retrieval region RS. Calibration may be performed at any timing, but may be performed during a final process of manufacturing of the encoder 1 or the robot 10, or during an operation of the encoder 1.

In the calibration, first, as illustrated in FIG. 12, the mark $21i$ (first mark) is located at a reference position X0 through an operation of a user. The reference position X0 may be any position in the retrieval region RS, but is set on a right portion (that is, a movement direction upstream side of the mark 21) in the retrieval region RS in FIG. 12. In the present embodiment, in a case where a single mark 21 is located at the reference position X0, another mark 21 is located in the retrieval region RS on a movement direction downstream side (the left side in FIG. 12) of the mark 21 with respect to the reference position X0.

The scale portion 2 is rotated through an operation or the like of the user. Here, in a case where the scale portion 2 is rotated, the mark $21i$ is moved in the rotation direction (from the right side to the left side in FIG. 12) of the scale portion 2 in the retrieval region RS due to the rotation. In this case, the estimation portion 5 causes the reference image i to track the movement of the mark $21i$, and also detects positions of the mark $21i$ in order by performing template matching. The estimation portion 5 counts the number of pixels of the reference image i which is moved in tracking of the movement of the mark $21i$ (counts the number of pixels P from the reference position X0 to a position X1).

As illustrated in FIG. 13, in a case where the mark $21i+1$ reaches the reference position X0, the estimation portion 5 performs template matching while causing the reference image i+1 to track movement of the mark $21i+1$, and counts the number of pixels of the reference image i+1 which is moved in tracking of the movement of the mark $21i+1$. Such counting of the number of pixels is also performed in the same manner for the mark $21i+2$ and the subsequent marks. When the mark $21i+1$ reaches the reference position X0, the mark $21i$ is located at the position X1.

As illustrated in FIG. 14, in a case where the mark $21i$ reaches the reference position X0, the estimation portion 5 stops counting the number of pixels. Consequently, it is possible to count the number of pixels (a total of the number of pixels P from the reference position X0 to the position X1 for each of the marks 21) of the imaging element 31 corresponding to a movement amount (rotation angle) of the mark 21 when the scale portion 2 is rotated by 360°. It is possible to obtain a rotation angle per pixel of the first arm 120 (or the scale portion 2) with respect to the base 110 on the basis of the counted number and the movement amount (that is, 360°) of the mark 21. It is possible to perform calibration by adjusting relative angle information of each reference image by using the rotation angle per pixel. Here, in a case where an absolute rotation angle of the first arm 120 (a rotation angle of the scale portion 2) with respect to the base 110 when the mark $21i$ is located at the reference position X0 is known, it is possible to perform calibration by adjusting absolute angle information of each reference image.

Hereinafter, with reference to FIG. 15, a description will be made of a flow of calibration in the encoder 1.

Figure 15:
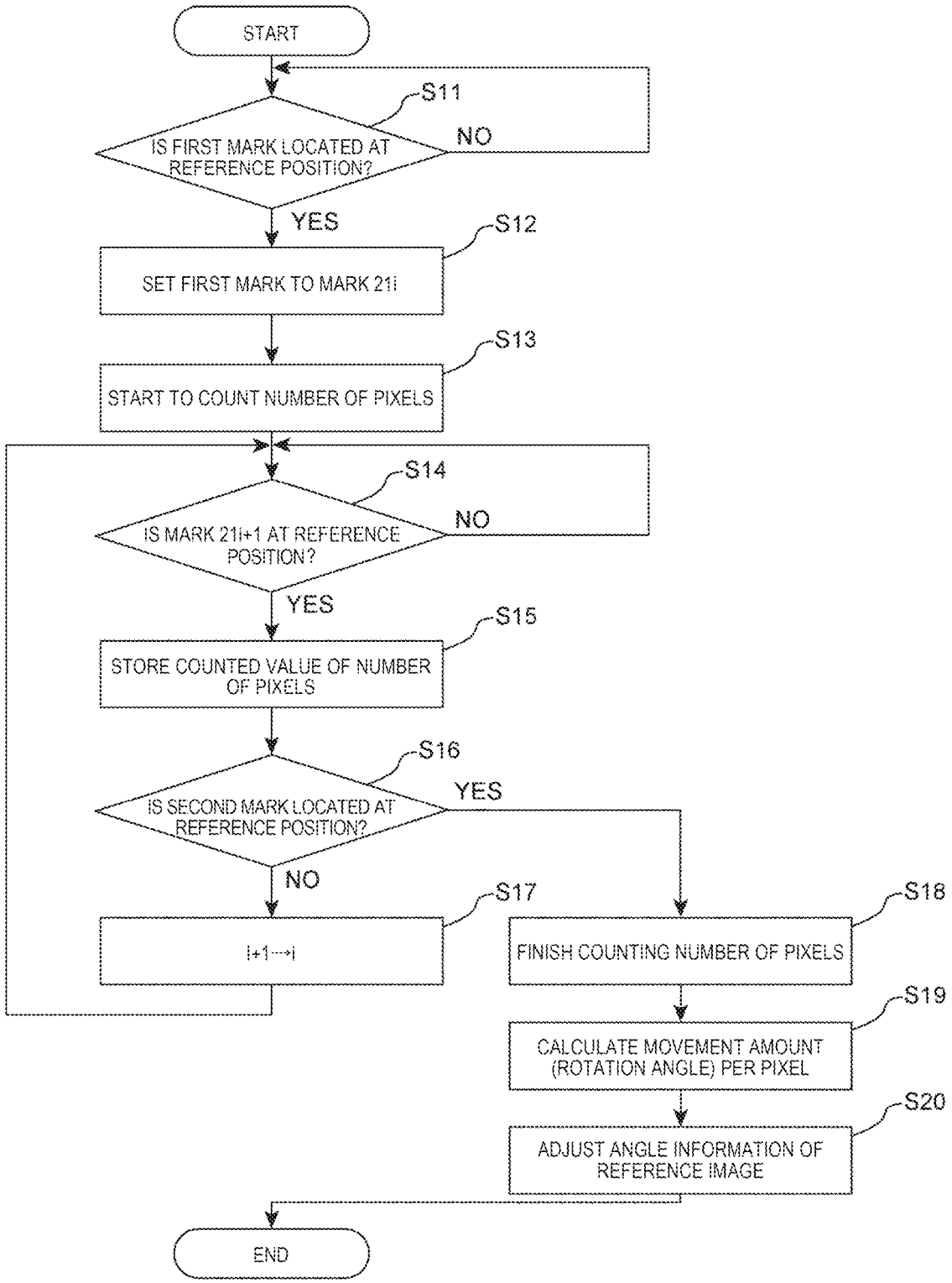
FIG. 15 is a flowchart illustrating a flow of calibration in the encoder illustrated in FIG. 2.

FIG. 15 is a flowchart illustrating a flow of calibration in the encoder illustrated in FIG. 2.

First, the estimation portion 5 determines whether or not a first mark which is any mark 21 among a plurality of marks 21 is located at the reference position X0 (step S11). The estimation portion 5 repeatedly performs step S11 until the first mark is located at the reference position X0 (NO in step S11). In a case where the first mark is located at the reference position X0 (YES in step S11), the estimation portion 5 sets the first mark to the mark 21$i$ (step S12), and starts to count the number of pixels as described above (step S13).

Next, the estimation portion 5 determines whether or not the mark 21$i$+1 (the mark 21 subsequent to the first mark) reaches the reference position X0 (step S14). The estimation portion 5 repeatedly performs step S14 until the mark 21$i$+1 is located at the reference position X0 (NO in step S14). In a case where the mark 21$i$+1 is located at the reference position X0 (YES in step S14), the estimation portion 5 stores a counted value of the number of pixels in the storage portion 6 (step S15). In this case, the counted value is stored in the storage portion 6 along with the mark 21$i$ or identification information of the reference image i corresponding thereto.

Next, the estimation portion 5 determines whether or not a second mark (in the present embodiment, the mark 21 which is the same as the first mark) which is any mark 21 among a plurality of marks 21 reaches the reference position X0 (step S16). In a case where the second mark is not located at the reference position X0 (NO in step S16), the estimation portion 5 sets i+1 as i (step S17), and proceeds to step S14 described above. Consequently, the estimation portion 5 counts the number of pixels until the second mark is located at the reference position X0, and stores a counted value thereof in the storage portion 6.

On the other hand, in a case where the second mark reaches the reference position X0 (YES in step S16), the estimation portion 5 finishes counting the number of pixels (step S18). The estimation portion 5 calculates a movement amount (rotation angle) per pixel (step S19). Thereafter, angle information of the reference image is adjusted by using the calculated movement amount (rotation angle) per pixel (step S20), and the calibration is finished.

As described above, the encoder 1 includes the base 110 which is a base portion, the scale portion 2 which is provided to be relatively rotatable with respect to the base 110 and has a plurality of marks 21, the imaging element 31 which is disposed in the base 110 and images the marks 21, and the estimation portion 5 which performs template matching on the captured image G in the imaging element 31 by using a reference image, so as to detect positions of the marks 21, and estimates a rotation state of the scale portion 2 with respect to the base 110. The plurality of marks 21 include a first mark and a second mark, and the estimation portion 5 counts the number of pixels of the imaging element 31 corresponding to a rotation angle of the scale portion 2 with respect to the base 110 until a position of the second mark is detected from detection of a position of the first mark, and performs calibration on the basis of the counted number of pixels and the rotation angle.

According to the encoder 1, since the estimation portion 5 counts the number of pixels of the imaging element 31 corresponding to a rotation angle of the scale portion 2 with respect to the base 110 until a position of the second mark is detected from detection of a position of the first mark, and performs calibration on the basis of the counted number of pixels and the rotation angle, it is possible to perform highly accurate calibration even without separately using an encoder for calibration.

Here, the estimation portion 5 counts the number of pixels of the imaging element 31 until a position of the first mark is detected next after the scale portion 2 is rotated by 360° with respect to the base portion 110 from detection of the position of the first mark, and performs calibration on the basis of the counted number of pixels and the rotation angle of 360°. Therefore, it is not necessary to measure relative positions of the first mark and the second mark in advance, and it is possible to simplify calibration. In a case where the first mark and the second mark are different from each other, relative positions (for example, angles) of the marks are required to be known.

The encoder 1 includes the storage portion 6 which stores an absolute position or an absolute angle of at least one of the first mark and the second mark with respect to the base 110 (base portion). Consequently, it is possible to perform calibration in the encoder 1 which is an absolute type encoder.

In the present embodiment, the scale portion 2 is relatively rotatable with respect to the base 110 (base portion). Consequently, it is possible to realize the encoder 1 which is a rotary encoder.

Here, the robot 10 includes the first decelerator 112 which is a decelerator delivering drive force to the first arm 120 (second member) from the base 110 (first member) side, and the scale portion 2 is connected to the first arm 120. Consequently, it is possible to estimate a rotation state of the first arm 120 with respect to the base 110 with high accuracy compared with a case of detecting a rotation state of the first decelerator 112 on the input shaft side.

Second Embodiment

Figure 16:
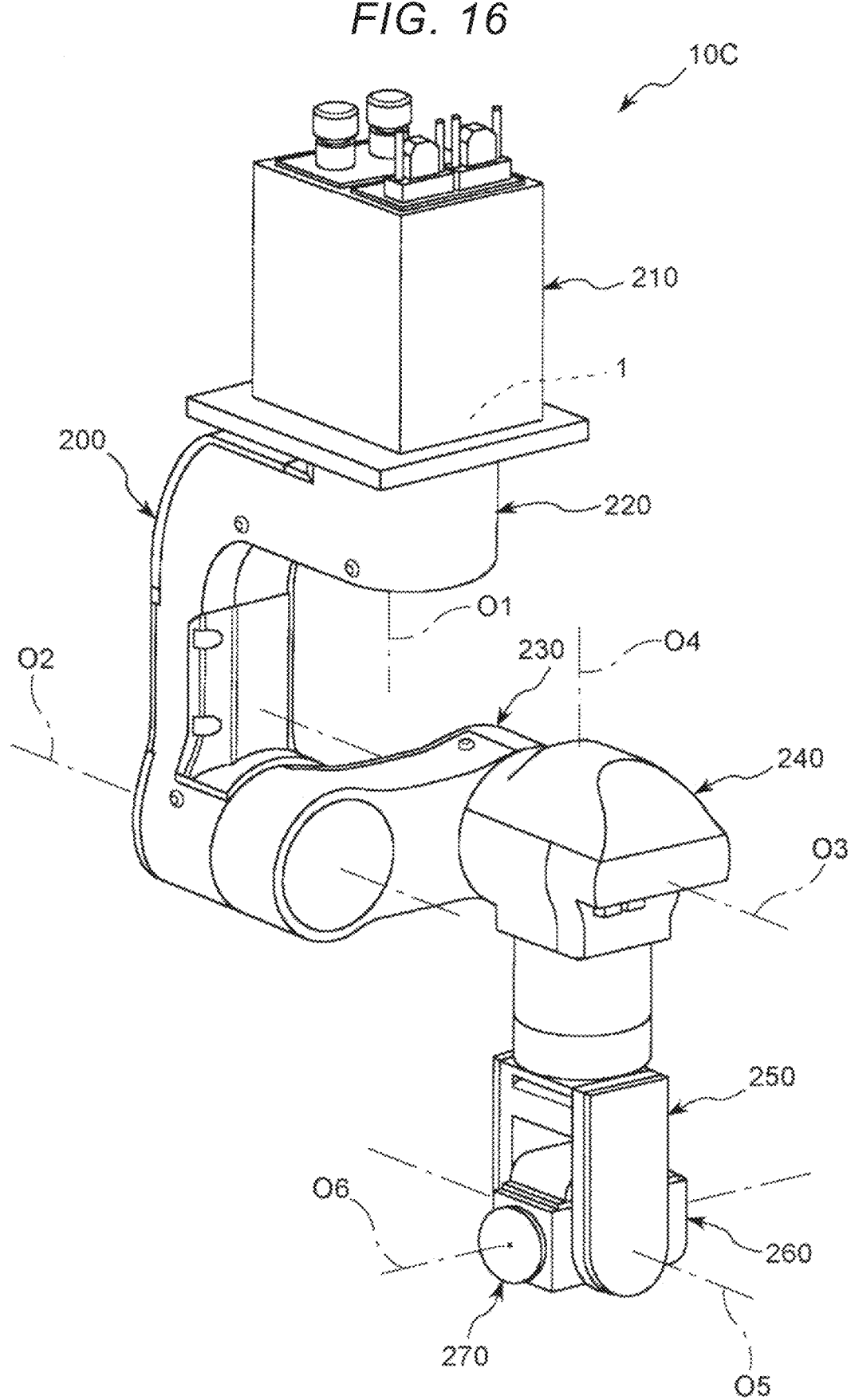
FIG. 16 is a perspective view illustrating a robot according to a second embodiment of the invention.

FIG. 16 is a perspective view illustrating a robot according to a second embodiment of the invention. Hereinafter, a base 210 side of a robot 10C will be referred to as a "basal end side", and an end effector side will be referred to as a "distal end side".

Hereinafter, the second embodiment will be described focusing on a difference from the above-described embodiments, and a description of the same content will be omitted.

The robot 10C illustrated in FIG. 16 is a vertical articulated (six-axis) robot. The robot 10C has the base 210 and a robot arm 200, and the robot arm 200 includes a first arm 220, a second arm 230, a third arm 240, a fourth arm 250, a fifth arm 260, and a sixth arm 270, and these arms are connected to each other in this order toward the distal end side from the basal end side. For example, an end effector such as a hand holding precision equipment or components is attachably and detachably attached to a distal end of the sixth arm 270. Although not illustrated, the robot 10C includes a robot control device (control unit) such as a personal computer (PC) controlling an operation of each portion of the robot 10C.

Here, the base 210 is fixed to, for example, a floor, a wall, or a ceiling. The first arm 220 is rotatable about a first rotation axis O1 with respect to the base 210. The second arm 230 is rotatable about a second rotation axis O2 which is orthogonal to the first rotation axis O1 with respect to the first arm 220. The third arm 240 is rotatable about a third rotation axis O3 which is parallel to the second rotation axis O2 with respect to the second arm 230. The fourth arm 250 is rotatable about a fourth rotation axis O4 which is orthogonal to the third rotation axis O3 with respect to the third arm 240. The fifth arm 260 is rotatable about a fifth rotation axis O5 which is orthogonal to the fourth rotation axis O4 with respect to the fourth arm 250. The sixth arm 270 is rotatable about the sixth rotation axis O6 which is orthogonal to the fifth rotation axis O5 with respect to the fifth arm 260. With respect to the first rotation axis O1 to the sixth rotation axis O6, the term "orthogonal" also includes a case where an angle formed between two axes is deviated from 90° within a range of ±5°, and the term "parallel" also includes a case where one of two axes is inclined with respect to the other within a range of ±5°.

Although not illustrated, each connection portion (joint) of the base 210 and the first arm 220 to the sixth arm 270 is provided with a drive source including a motor and a decelerator. Here, a drive source which rotates the first arm 220 with respect to the base 210 is provided with the encoder 1. A detection result in the encoder 1 is input to, for example, the robot control device (not illustrated), and is used to control driving of the drive source which rotates the first arm 220 with respect to the base 210. Although not illustrated, encoders are provided in other joints, and the encoder 1 may be used as the encoders.

As mentioned above, the robot 10C includes the base 210 which is a first member, and the first arm 220 which is a second member provided to be rotatable with respect to the base 210, and the encoder 1 of the first embodiment or the second embodiment, and the encoder 1 detects a rotation state of the first arm 220 with respect to the base 210. According to the robot 10C, detection accuracy in the encoder 1 is high, and thus it is possible to control an operation of the robot 10C with high accuracy by using a detection result in the encoder 1.

In the above description, a description has been made of a case where the encoder 1 detects a rotation state of the first arm 220 with respect to the base 210, but the encoder 1 may be provided in another joint so as to detect a rotation state of another arm. In this case, an arm on one side with respect to the joint may be regarded as a first member, and an arm on the other side may be regarded as a second member.

2. Printer

Figure 17:
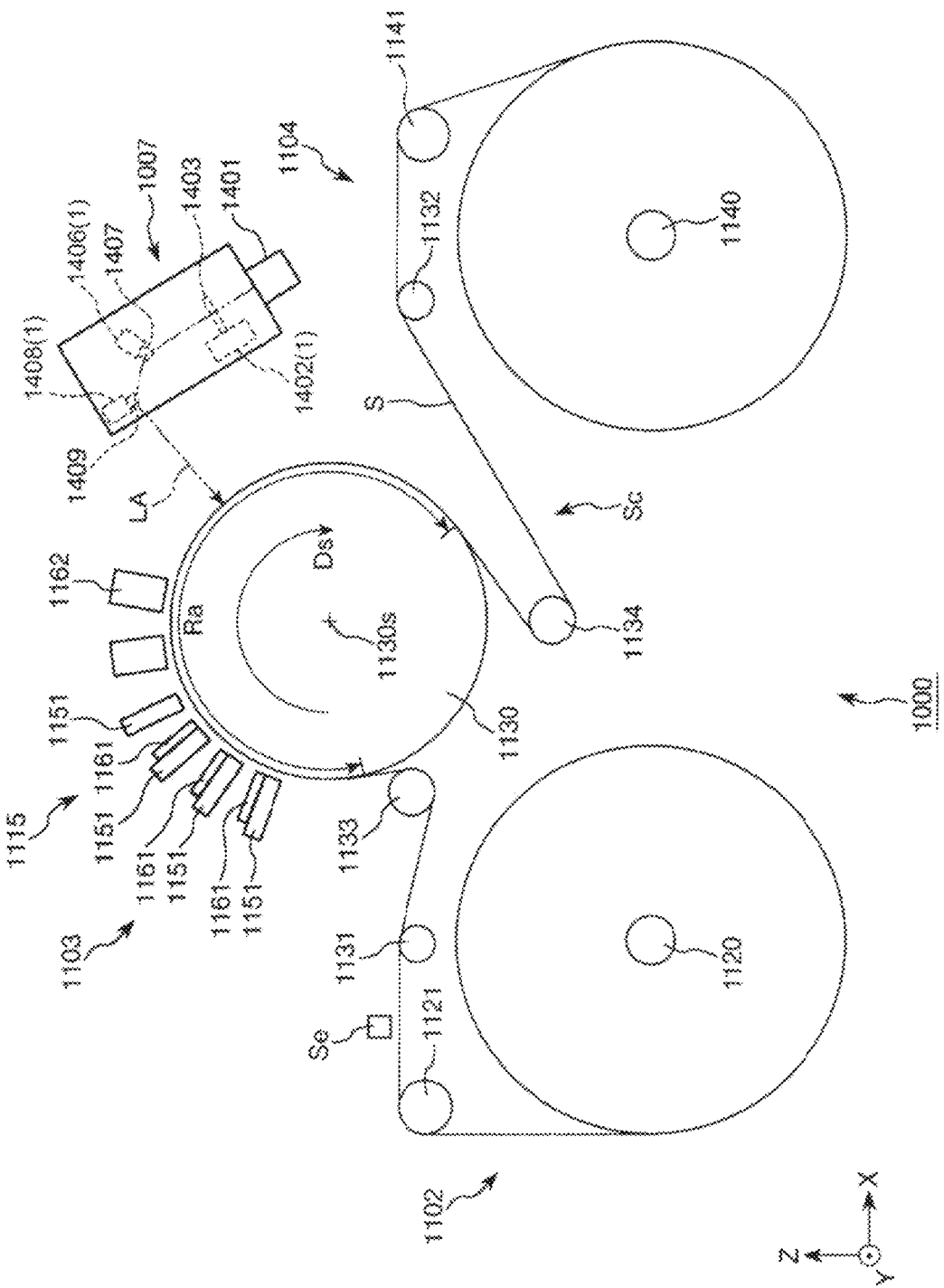
FIG. 17 is a diagram illustrating a schematic configuration of a printer of an embodiment of the invention.

FIG. 17 is a diagram illustrating a schematic configuration of a printer of an embodiment of the invention.

A printer 1000 illustrated in FIG. 17 is a label printing device including a drum-shaped platen. In the printer 1000, a single sheet S (web) such as a paper type or a film type as a recording medium of which both ends are wound on a delivery shaft 1120 and a winding shaft 1140 in a roll form is hung between the delivery shaft 1120 and the winding shaft 1140, and the sheet S is transported from the delivery shaft 1120 to the winding shaft 1140 along a transport path Sc hung in the above-described way. The printer 1000 is configured to record (form) an image on the sheet S by discharging a functional liquid onto the sheet S transported along the transport path Sc.

The printer 1000 is configured, as a schematic configuration, to include a delivery portion 1102 which delivers the sheet S from the delivery shaft 1120, a process portion 1103 which records an image on the sheet S delivered from the delivery portion 1102, a laser scanner device 1007 which cuts out the sheet S on which the image is recorded in the process portion 1103, and a winding portion 1104 which winds the sheet S on the winding shaft 1140.

The delivery portion 1102 includes the delivery shaft 1120 winding an end of the sheet S thereon, and a driven roller 1121 winding the sheet S extracted from the delivery shaft 1120 thereon.

In the process portion 1103, the sheet S delivered from the delivery portion 1102 is supported by a platen drum 1130 as a support portion, and a recording head 1151 or the like disposed in a head unit 1115 which is disposed along an outer circumferential surface of the platen drum 1130 performs an appropriate process so as to record an image on the sheet S.

The platen drum 1130 is a circular drum which is rotatably supported by a support mechanism (not illustrated) centering on a drum shaft 1130s, and winds the sheet S transported from the delivery portion 1102 to the winding portion 1104 on a rear surface (a surface on an opposite side to a recording surface) side thereon. The platen drum 1130 is driven to rotate in a transport direction Ds of the sheet S as a result of receiving friction force with the sheet S, and supports the sheet S from the rear surface side in a range Ra in the circumferential direction thereof. Here, the process portion 1103 is provided with driven rollers 1133 and 1134 turning the sheet S on both sides of the winding portion to the platen drum 1130. Driven rollers 1121 and 1131 and a sensor Se are provided between the delivery shaft 1120 and the driven roller 1133, and driven rollers 1132 and 1141 are provided between the winding shaft 1140 and the driven roller 1134.

The process portion 1103 includes a head unit 1115, and the head unit 1115 is provided with four recording heads 1151 corresponding to yellow, cyan, magenta, and black. Each of the recording heads 1151 faces a front surface of the sheet S wound on the platen drum 1130 with a slight clearance (platen gap), and discharges a functional liquid of a corresponding color from nozzles in an ink jet method. The respective recording heads 1151 discharge functional liquids onto the sheet S transported in the transport direction Ds, and thus a color image is formed on the front surface of the sheet S.

Here, as the functional liquids, ultraviolet (UV) ink (photocurable ink) which is cured when being irradiated with ultraviolet rays (light) is used. Thus, the head unit 1115 of the process portion 1103 is provided with first UV sources 1161 (light irradiation portions) among the plurality of recording heads 1151 in order to temporarily cure the UV ink and to fix the UV ink to the sheet S. A second UV source 1162 as a curing portion is provided on a downstream side of the transport direction Ds with respect to the plurality of recording heads 1151 (head unit 1115).

The laser scanner device 1007 is provided to partially cut out the sheet S on which an image is recorded, or to divide the sheet S. Laser light which is caused to oscillate by a laser oscillator 1401 of the laser scanner device 1007 is applied to the sheet S which is a processed object via a first lens 1403 and a first mirror 1407 or a second mirror 1409 of which positions or rotation positions (angles) are controlled by drive devices 1402, 1406 and 1408 including the encoder 1 of the first embodiment or the second embodiment. As mentioned above, an irradiation position of laser light LA applied to the sheet S is controlled by the respective drive devices 1402, 1406 and 1408, and thus the laser light LA can be applied to a desired position on the sheet S. In the sheet S, a portion thereof irradiated with the laser light LA is melted, and thus the sheet S is partially cut out or divided.

The printer 1000 described above includes the encoder 1. According to the printer 1000, the printer 1000 can perform a highly accurate operation by using the encoder 1 which performs highly accurate calibration.

As mentioned above, the encoder, the robot, and the printer according to the preferred embodiments of the invention have been described, but the invention is not limited thereto, and a configuration of each portion may be replaced with any configuration having the same function. Any other constituent element may be added thereto. The configurations of the above-described two or more embodiments may be combined with each other.

In the embodiments, a description has been made of a case where the encoder according to the embodiments of the invention is applied to a rotary encoder, but this is only an example, and the encoder according to the embodiments may be applied to a linear encoder. In this case, the scale portion is provided to be relatively movable with respect to the base portion, and a plurality of marks are disposed along a movement direction thereof. The estimation portion performs template matching on a captured image in the imaging element by using a reference image, so as to detect a position of the mark, and estimates a movement state of the scale portion with respect to the base portion. The movement state may include, for example, a movement distance, a movement speed, or a movement direction.

Here, calibration in a linear encoder may be performed in the same manner as in the above-described embodiment. In other words, a plurality of marks include a first mark and a second mark, and the estimation portion counts the number of pixels of the imaging element corresponding to a movement amount of the scale portion with respect to the base portion until a position of the second mark is detected from detection of a position of the first mark, and performs calibration on the basis of the counted number of pixels and the movement amount. The first mark and the second mark are located at positions which are different from each other, and a relative position (distance) is required to be known.

The encoder according to the embodiments of the invention may be applied to any type such as an absolute type and an incremental type.

In the embodiments, a description has been made of an exemplary configuration in which the base of the robot is a "base portion (first member)", and the first arm is a "rotation portion (second member)", but this is only an example, and one of any two members which are relatively rotated may be a "base portion", and the other member is a "rotation portion". A location where the encoder is provided is not limited to a joint between the base and the first arm, and may be a joint between any two arms which are relatively rotated. A location where the encoder is provided is not limited to a joint of the robot.

In the above-described embodiments, the number of arms of the robot is one, but the number of arms of the robot is not limited thereto, and may be, for example, two or more. In other words, the robot according to the embodiments of the invention may be, for example, a robot with two arms or a robot with a plurality of arms.

In the embodiments, the number of arms of the robot is two or six, but the number of arms of the robot is not limited thereto, and may be, for example, one, or three or more and five or less, or seven or more.

In the above-described embodiments, a location where the robot according to the embodiments of the invention is provided is not limited to a floor surface, and may be, for example, a ceiling surface or a sidewall surface, and may be a moving object such as an automatic guided vehicle (AGV). The robot according to the embodiments of the invention is not limited to being provided to be fixed to a structure such as a building, and may be, for example, a leg type walking (traveling) robot having legs.

The encoder according to the embodiments of the invention is not limited to the above-described printer, and may be used for various printers such as an industrial printer and a consumer printer, having a rotation portion. In a case where the encoder according to the embodiments of the invention is used for a printer, a location where the encoder is provided is not limited to the above-described locations, and may be used for a paper feeding mechanism, and a movement mechanism of a carriage mounted with an ink head of an ink jet printer, for example.

The entire disclosure of Japanese Patent Application No. 2017-205416, filed Oct. 24, 2017 is expressly incorporated by reference herein.

What is claimed is:

1. A robot comprising:
a first member;
a second member rotatably connected to the first member, a plurality of marks being provided on a surface of the second member, the plurality of marks including a first mark and a second mark;
a decelerator configured to deliver drive force to the second member from the first member;
an image sensor disposed in the first member, the image sensor being configured to capture the plurality of marks on the surface of the second member;
a memory configured to store a program and first and second reference images corresponding to the first mark and the second mark, respectively; and
a processor configured to execute the program so as to:
  continuously cause the image sensor to capture images of the plurality of marks by comparing each of the captured images with the first reference image when the second member rotates relative to the first member;
  identify a first location of the first mark in the plurality of marks when the captured image matches with the first reference image;
  continuously cause the image sensor to capture images of the plurality of marks by comparing each of the captured images with the second reference image when the second member rotates relative to the first member;
  identify a second location of the second mark in the plurality of marks when the captured image matches with the second reference image;
  count a number of pixels in the captured images that are located at positions between the first location of the first mark and the second location of the second mark;
  determine a physical quantity amount corresponding to the counted number of pixels; and
  perform calibration of the robot in response to the determined physical quantity amount.

2. The robot according to claim 1,
wherein the memory is configured to store an absolute position or an absolute angle of at least one of the first mark and the second mark with respect to the first member.

3. A robot comprising:
a first member;
a second member rotatably connected to the first member, a plurality of marks being provided on a surface of the second member, the plurality of marks including a first mark;
a decelerator configured to deliver drive force to the second member from the first member;

an image sensor disposed in the first member, the image sensor being configured to capture the plurality of marks on the surface of the second member;
a memory configured to store a program and a first reference image corresponding to the first mark; and
a processor configured to execute the program so as to:
  continuously cause the image sensor to capture images of the plurality of marks by comparing each of the captured images with the first reference image when the second member rotates relative to the first member;
  identify a first location of the first mark in the plurality of marks when the captured image matches with the first reference image at a first time;
  continuously cause the image sensor to capture images of the plurality of marks by comparing each of the captured images with the first reference image when the second member rotates relative to the first member by 360° after the identification of the first location of the first mark;
  identify a first location of the first mark in the plurality of marks when the captured image matches with the first reference image at a first time;
  count a number of pixels in the captured images that are located at positions between the first location of the first mark and the second location of the first mark;
  determine a physical quantity amount corresponding to the counted number of pixels; and
  perform calibration of the robot in response to the determined physical quantity amount and the rotation angle of 360°.

4. The robot according to claim 3,
wherein the memory is configured to store an absolute position or an absolute angle of the first mark with respect to the first member.

5. A printer comprising:
a platen configured to transfer a printing medium;
a head configured to record an image on the printing medium; and
an optical device having:
  a light source configured to emit light toward the printing medium;
  a first member;
  a second member, the second member rotating relative to the first member, a plurality of marks being provided on a surface of the second member, the plurality of marks including a first mark and a second mark;
  a decelerator configured to deliver drive force to the second member from the first member;
  an image sensor disposed in the first member, the image sensor being configured to capture the plurality of marks on the surface of the second member;
  a memory configured to store a program and first and second reference images corresponding to the first mark and the second mark, respectively; and
  a processor configured to execute the program so as to:
    continuously cause the image sensor to capture images of the plurality of marks by comparing each of the captured images with the first reference image when the second member rotates relative to the first member;
    identify a first location of the first mark in the plurality of marks when the captured image matches with the first reference image:
    continuously cause the image sensor to capture images of the plurality of marks by comparing each of the captured images with the second reference image when the second member rotates relative to the first member;
    identify a second location of the second mark in the plurality of marks when the captured image matches with the second reference image;
    count a number of pixels in the captured images that are located at positions between the first location of the first mark and the second location of the second mark;
    determine a physical quantity amount corresponding to the counted number of pixels; and
    perform calibration of the optical device in response to the determined physical quantity amount.

6. The printer according to 5,
wherein the memory is configured to store an absolute position or an absolute angle of at least one of the first mark and the second mark with respect to the first member.

* * * * *